United States Patent [19]

Thomas et al.

[11] 4,251,901
[45] Feb. 24, 1981

[54] APPARATUS AND METHOD FOR SPLITTING POULTRY BREASTS

[75] Inventors: Phillip R. Thomas, Doswell, Va.; William P. Cannon, Wilkesboro, N.C.; Jackie T. Whittington, Purlear, N.C.; James H. Steelman, Wilkesboro, N.C.; Donald C. Oliver, Millers Creek, N.C.; Howard W. Adams; Michael A. Johnson, both of N. Wilkesboro, N.C.

[73] Assignee: Holly Farms Poultry Industries, Inc., Wilkesboro, N.C.

[21] Appl. No.: 59,486

[22] Filed: Jul. 20, 1979

[51] Int. Cl.³ .......................................... A22C 21/00
[52] U.S. Cl. ................................... 17/52; 17/11
[58] Field of Search ............................ 17/11, 52

[56] References Cited

U.S. PATENT DOCUMENTS

| 2,310,881 | 2/1943 | Swanson | 17/11 X |
| 2,941,238 | 6/1960 | Reeves | 17/11 |
| 3,624,866 | 12/1971 | Crappell | 17/11 |
| 3,639,945 | 2/1972 | Duncan et al. | 17/11 |
| 3,946,461 | 3/1976 | Martin et al. | 17/11 |
| 4,067,085 | 1/1978 | Gasbarro | 17/11 |
| 4,131,973 | 1/1979 | Verbakel | 17/11 X |
| 4,136,421 | 1/1979 | Scheier et al. | 17/11 X |
| 4,184,229 | 1/1980 | Soran | 17/11 |

Primary Examiner—Willie G. Abercrombie

[57] ABSTRACT

Apparatus and method for receiving, positioning and clamping a chicken and severing the breast bone of the clamped chicken before releasing it while moving the chicken in a directed path of travel.

17 Claims, 10 Drawing Figures

APPARATUS AND METHOD FOR SPLITTING POULTRY BREASTS

BACKGROUND AND OBJECTIVES OF THE INVENTION

Poultry has become an ever-increasing food in this and other countries not merely because of its high protein value but also by reason of its relatively lower cost compared to other high protein foods including meat and fish. The processing of poultry generally involves numerous manual operations which tend to increase the cost of poultry. One of the most difficult manual operations encountered in a poultry processing plant is the splitting or severing of the breast of a chicken particularly while it is moving continuously in a suspended condition from a shackle which is suspended from an overhead travelling conveyor. The splitting operation is performed manually by using a sharp blade or other instrument. The splitting operation is not only time-consuming, tedious and physically exhausting when performed by an operator on a production line but the problem of achieving repeatedly a uniform split or cut for each chicken to provide uniformity of end product is virtually non-existent.

Whether the chicken is to be packaged with separate parts or a combination of parts, the resulting package must be uniform in the ultimate wrapped package to present a pleasing appearance to the consumer at the counter at the time of purchase. Discriminating purchasers may reject a package containing an improperly cut parts of a chicken.

It will be readily appreciated that a chicken freely suspended from a shackle that is freely swingable from a travelling conveyor provides a minimum of support for clamping a chicken in a firm position each time enabling an operator to sever the breast bone and meat with a clean cut each and every time. After the breast severing operation, the individual chickens continue in their travel suspended from the conveyed shackle for further processing of the chicken before removal of each chicken from its shackle whether for cutting into drumsticks, thighs, wings, breasts, and other parts.

It is, therefore, an objective of this invention to provide an apparatus and method for receiving, positioning and clamping a chicken while it is moving along a directed path and severing the breast bone of a clamped chicken in a predetermined position before the chicken is released while moving the chicken continuously in its directed path of travel.

Another objective of this invention is the provision of an apparatus in which chickens suspended from a travelling conveyor will be automatically positioned and firmly held while the breast bone is severed automatically.

Still another objective of this invention is the provision of a mechanism for releasably clamping a chicken while moving in a directed path of travel and firmly supporting the chicken for an interval of time permitting further processing of the chicken before releasing it.

Yet another objective is to position and clamp a chicken and to sever the breast bone automatically while the chicken travels along a prescribed path before releasing the chicken with the breast bone split for subsequent processing.

Still a further objective is to process a chicken by severing the breast bone automatically as the chicken is moved from one location to another while suspended from a moving shackle.

Other objectives and many of the attendant advantages of this novel apparatus and method will become rapidly apparent to those skilled in the poultry processing technology from the following detailed description of a preferred embodiment of the apparatus and description of the method taken in conjunction with the accompanying drawings and the appended claims in which claims mechanical equivalents are contemplated from the precise structure and method claims.

DETAILED DESCRIPTION OF A PREFERRED EMBODIMENT OF THE APPARATUS AND METHOD OF THE INVENTION

Brief Summary of the Apparatus

Figures 1, 3:
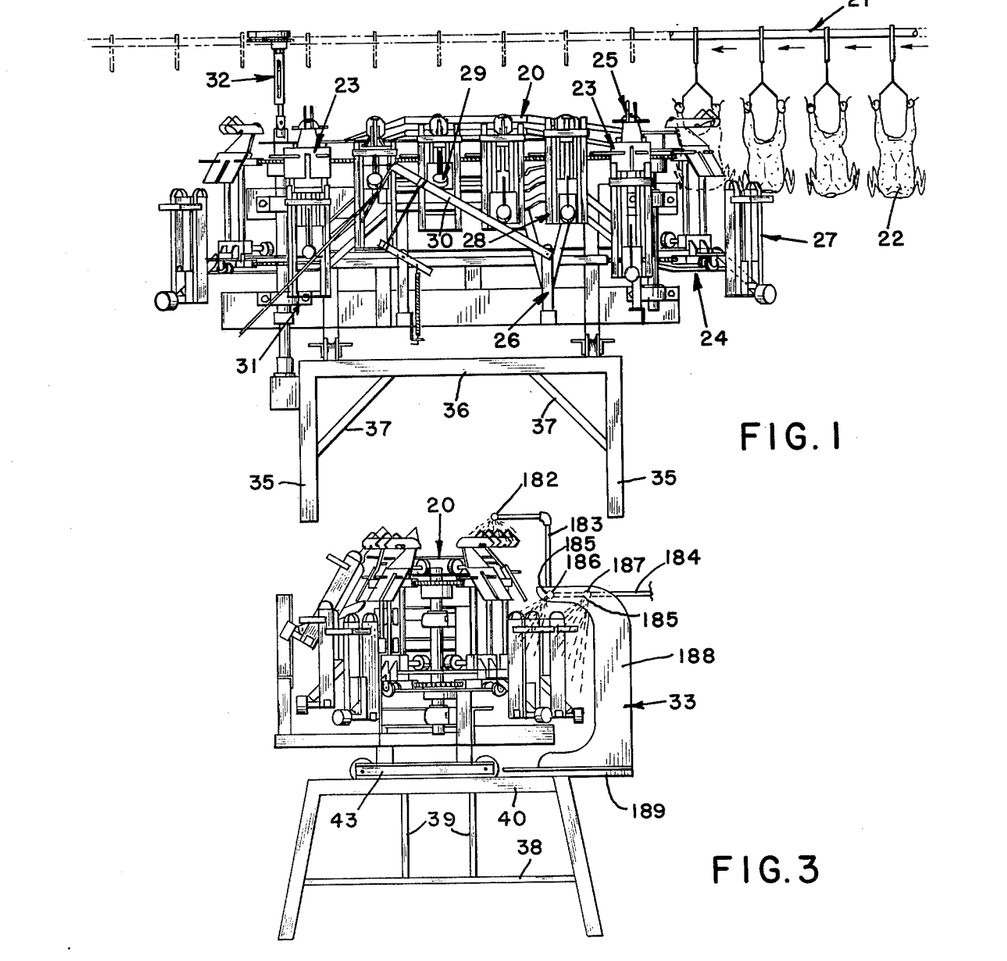
FIG. 1 is a front elevational view of an apparatus for receiving, positioning, clamping, and splitting the breasts of chickens, and a partial view of an overhead chicken-supporting shackle and shackle conveyor.
FIG. 3 is a right end view of FIG. 1 omitting the overhead conveyor and certain other parts shown in FIG. 1.
Figure 2:
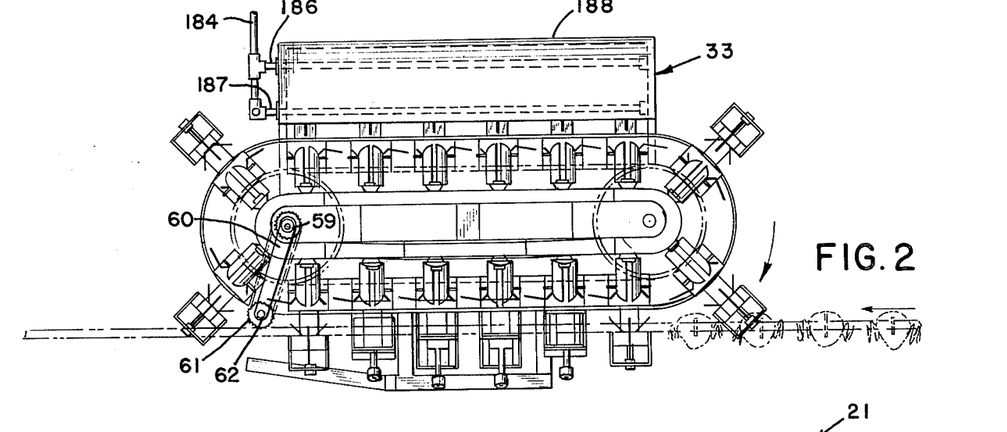
FIG. 2 is a top plan view of FIG. 1.

The chicken breast splitting apparatus 20 shown in FIGS. 1-3 is positioned beneath a horizontally travelling overhead shackle conveyor 21 for conveying freely suspended chickens 22 at a predetermined rate of travel to the chicken breast splitting apparatus 20. The chicken splitting breast apparatus 20 is in the form of a carousel with a series of spaced-apart complementary mechanisms including a chicken-supporting means 23 mounted on a chain conveyor and synchronized with the travel of the overhead conveyor 21 to receive and retain a chicken 22 thereon at the chicken introducing section 24 of the apparatus. A chicken clamping means 25 is pivotally connected to move and cooperate with the chicken-supporting means to clamp and retain securely a chicken positioned on the chicken-supporting means upon displacement of the chicken-supporting means 23 in a directed path of travel. After the chicken 22 has been clamped securely in position on the chicken-supporting means 23 by the chicken-clamping means 25 when the latter is pivoted downwardly against the positioned chicken, in the second sequence 26 of the breast splitting apparatus 20, a chicken-supporting means 27 orients the chicken 22 into a preselected position for the chicken breast to be lodged before the splitting operation. At the position 28 in FIG. 1, the chicken 22 will be securely clamped in position on the chicken-supporting means 23 by the chicken-clamping means 25 from above and by the chicken-positioning means 27 from the front. As the shackled chicken 22 continues its travel through the breast splitting apparatus 20, the breast splitting mechanism 29 is actuated and raised vertically by the breast splitting actuating track 30 urging the displaceable breast splitting means 29 to split the chicken breasts while in the chicken clamped position while still suspended from the overhead shackle conveyor 21. Upon completion of the breast splitting operation, the chicken-clamping means 25 will be pivoted out of engagement with the chicken and the chicken-positioning means 27 will disengage from the chicken, and the displaceable breast splitting means 29 will be lowered freeing the chicken 22 to continue in its path of travel from off of the chicken-supporting means 23 at the discharge position 31.

With the various mechanisms and components being disengaged from the chicken, they will continue to travel on the carousel conveyor in synchronization through the sprocket, chain and drive linkage mechanism 32 which drives the breast splitting apparatus 20 from the overhead conveyor 21 through the spray and wash chamber 33 shown in FIGS. 2 and 3 preparatory for a repeat cycle upon receiving the next chicken in the flight of the conveyor 21.

Apparatus Frame, Driven Mechanism, Cams, Raceways and Tracks

Figure 4:
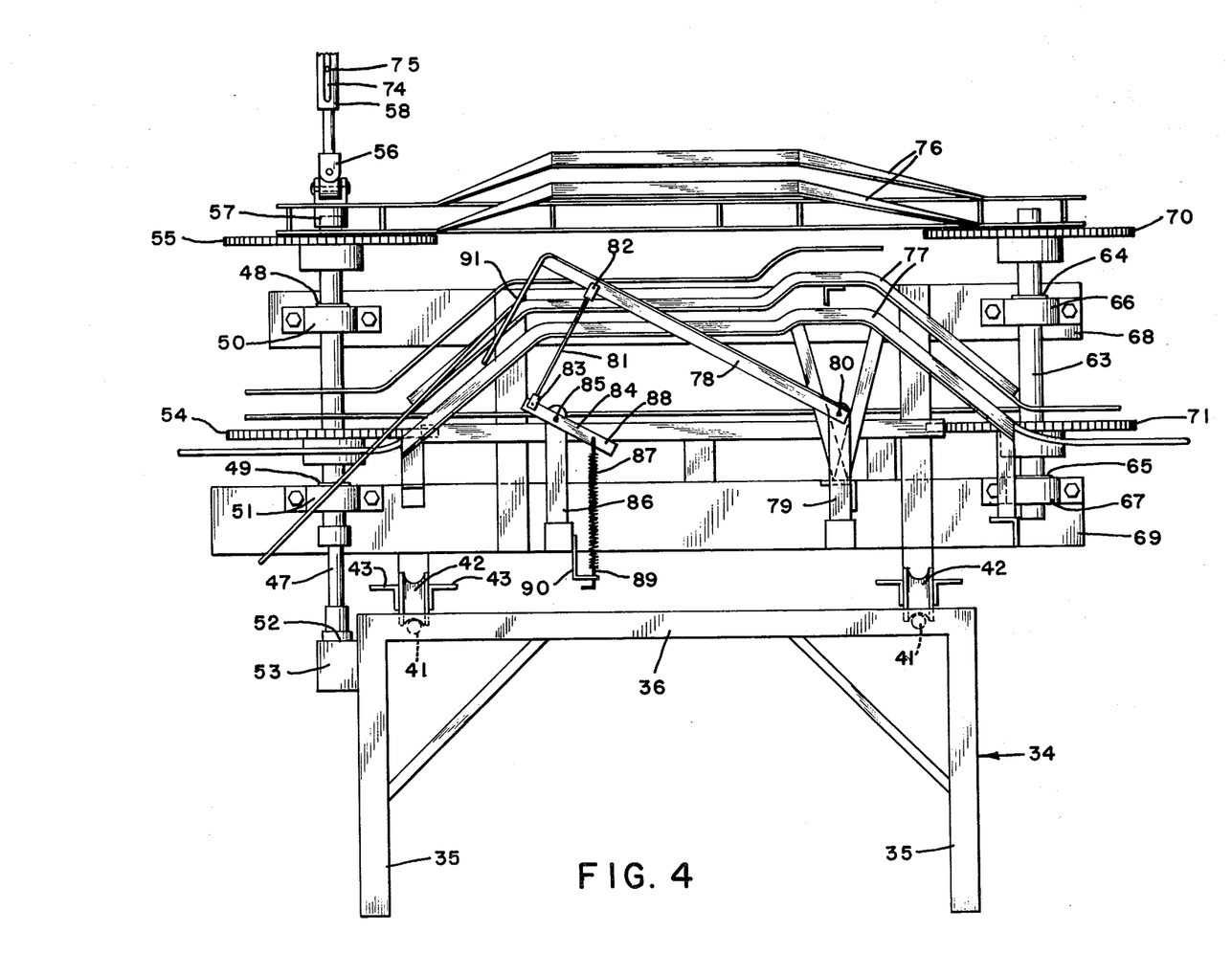
FIG. 4 is a slightly enlarged front elevational view of the apparatus for splitting the breasts of chickens with the chicken-supporting means, chicken-clamping means, breast-severing means, among other parts and assemblies being omitted illustrating the various drive means and actuating cam, raceways and tracks.
Figure 5:
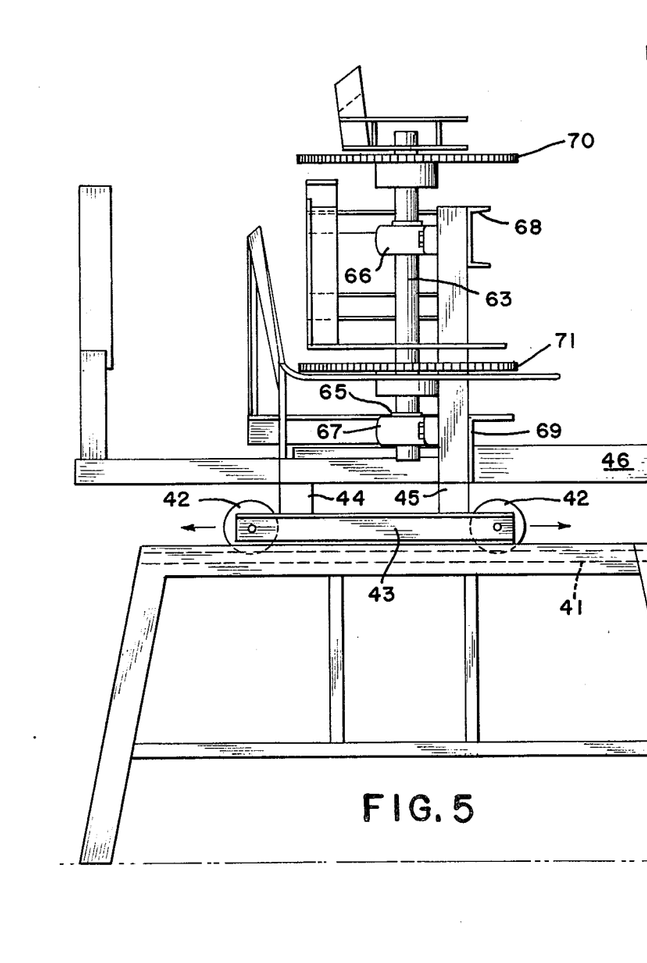
FIG. 5 is a right end view of FIG. 4.

There is illustrated in FIGS. 4 and 5 the base supporting frame 34 in which spaced-apart legs support a horizontal beam 36 with cross-brace members 37 being secured to the beam 36 and a leg 35 a horizontal brace 38 is secured to the leg 35 at the frame sides with vertical struts 39 extending between the horizontal brace 38 and the beam section 40.

A pair of horizontally-extending tracks 41 having their ends securely fastened to the beams 36 support the rollers thereon which rollers are rotatably mounted in the angle beams 43 through suitable bearings (not shown). Vertically spaced-apart support beams 44 and 45 are secured to the horizontal angle beam 43 on which the upper carriage 46 is supported at each end of the apparatus. The carriage 46 supporting the apparatus 20 is displaceable laterally into and out of the line of travel of the overhead conveyor 21 should there be any necessity for maintenance of the apparatus which may be accomplished without interrupting the travel of the conveyor 21 whether by splitting the breast of the chickens manually or introducing a second apparatus 20 in position. A vertical driven shaft is supported in the vertically spaced bearing 48 and 49 supported in the bearing housing 50 and 51 for rotation about a vertical axis with the lower end 52 of shaft 47 being supported within the bearing housing 53. Chain sprocket 54 is suitably keyed for rotation with shaft 47 with chain sprockets 55 also being keyed to shaft 47 to rotate therewith and in spaced relation to chain sprocket 54. Universal coupling 56 is secured to the upper end 57 of shaft 47 to be joined by the vertically adjustable connecting link 58 at the upper end of which link 58 a sprocket wheel 59 is secured to be driven by a chain 60 from the sprocket 61 that is driven by a chain (not shown) connected to the overhead conveyor 21 with the sprocket 61 having a sprocket wheel 62 thereon for driving chain 60. Shaft 63 is also vertically mounted in bearings 64 and 65 supported within their housings 66 and 67 which housings 50, 51, 66 and 67 are suitably secured to horizontally extending beams 68 and 69 which are supported by the vertical members 45. Chain receiving sprockets 70 and 71 are keyed to the shaft 63 to rotate therewith with chain-receiving sprockets 55 and 70 cooperating to support and drive the upper supporting chain 72 and chain supporting sprockets 54 and 71 driving supporting chain 73.

At such time that the apparatus 20 is displaced from the overhead conveyor, the link 58 is provided with a telescoping extension rod 74 having a stop pin 75 which will permit the displacement of the apparatus 20 away from conveyor 21. The link 58 may be readily disengaged, if necessary, in the event the apparatus 20 must be removed from the line a greater distance than the linkage 32 will permit.

Figure 6:
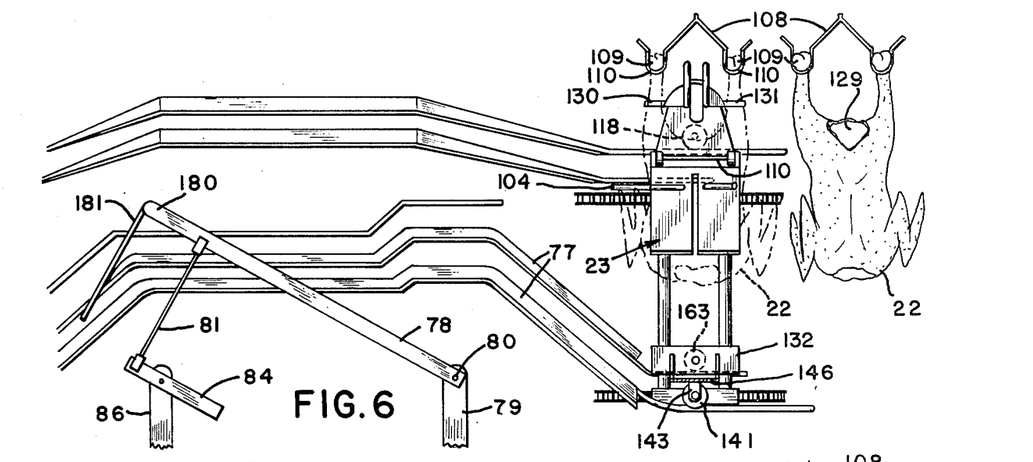
FIG. 6 is a partial front elevational view of the initial orientation of a chicken upon introduction into the apparatus for splitting the breasts of chickens while the chicken being processed is suspended from a shackle supported by an overhead conveyor.

An upper guide rail 76 is secured to the vertical beam 45 for guiding and supporting the chicken-clamping means 25 from a disengaged to an engaged position to be described hereafter. A second set of guide rails 77 is also supported from the vertical beams 45 to control the vertical displacement of the chicken-positioning means 27 from a chicken dis-engaged position to a chicken-engaging position, and a chicken-releasing position at various positions along the track 77 as shown in FIGS. 1, 4 and 6. A guide raceway 78 is pivotally connected to the vertical stanchion 79 about the pivot joint 80 with the raceway 78 being inclined upwardly to the left in FIG. 4 to be supported by the adjustable link 81 that is connected at one end 82 thereof to a medial portion of the raceway 78 with the other end 83 connected to the pivot link 84 about the pivot connection 85 supported at the top of stanchion member 86 with both stanchions 79 and 86 being supported from beam 69. A helical spring 87 is connected adjacent to one end 88 of the link 84 with the other spring end 89 being connected to the angle bracket 90 secured to the base of the stanchion 86 with the spring 87 maintaining the raceway 78 in a yieldable position upwardly to engage and actuate the displacement of the chicken breast splitting means 29.

The breast splitting raceway 78 will be biased or urged resiliently upwardly to pivot in a clockwise direction about the pivot connection 80 through the downward pulling action of helical spring 87 which will rotate link 84 in a clockwise direction also with raceway 78 being urged in a counter-clockwise direction upon being engaged by the breast splitting means 29 as it travels in its directed path of travel while the breast of the clamped chicken is split. The trailing downwardly extending raceway section 91 will guidably support the breast splitting means 29 upon completion of the breast splitting operation during descent as shown in FIG. 1.

The Chicken-Supporting Means

Figure 10:
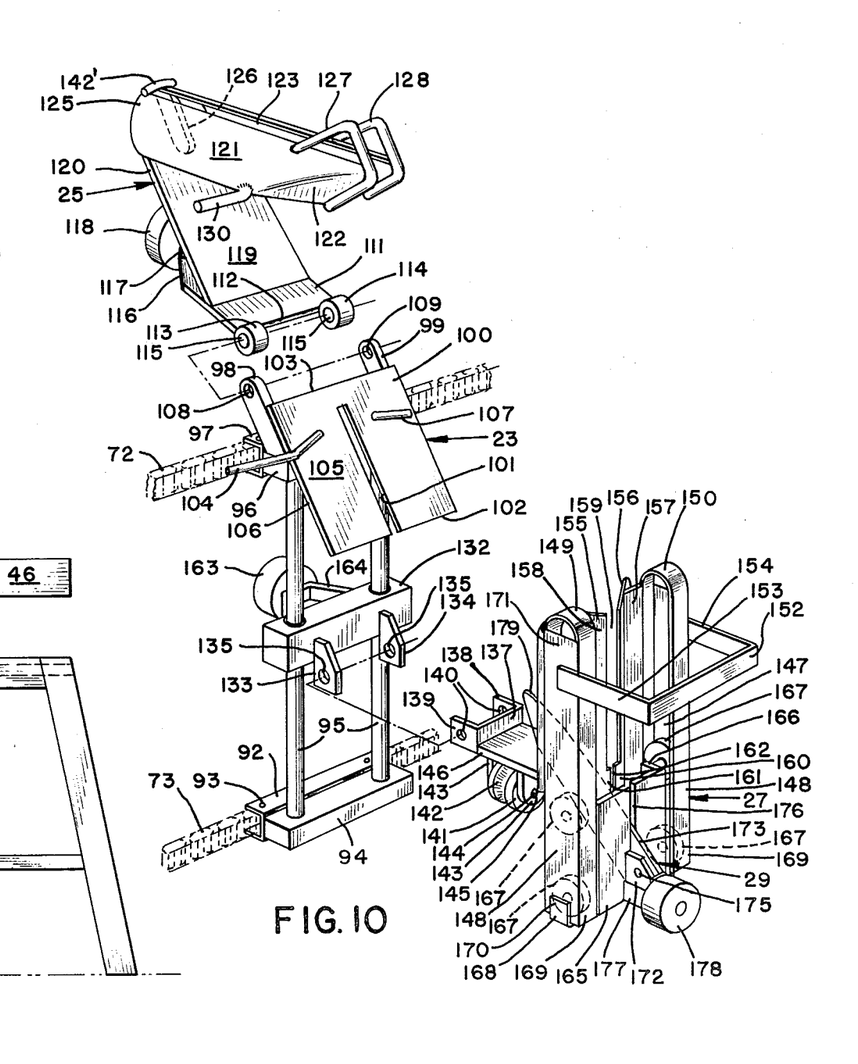
FIG. 10 is an exploded partial perspective view of the chicken-supporting means, chicken-clamping means, and breast severing means with displaceable knife omitting the actuating cam, raceways and tracks.

The chicken-supporting means 23 is best illustrated in FIGS. 6 and 10. A U-shaped conveyor chain-receiving channel 92 is secured by suitable fastening means 93 to the lower conveyor chain 73 with a rectangular supporting base 94 secured to the channel 92 to support the vertically extending guide rods 95 thereon which extend upwardly to be retained in the upper block 96 to which is fastened a U-shaped chain-receiving channel 97 that is secured to the upper conveyor chain 72. Upwardly extending arms 98 and 99 are secured to block 96 at an angle tilted from the vertical to support the chicken-supporting plates 100 securely on the arms 98 and 99. The chicken-supporting plate is provided with a splitting member-receiving slot 101 which extends from the lower plate edge 102 upwardly to a position adjacent to the plate edge 103. A chicken guide rod 104 is secured to the face 105 of the chicken-supporting plate 100 and extends laterally beyond the left edge 106 of plate 100 to cooperate with the protruding lug 107 secured to the face 105 of plate 100 for positioning a chicken as it is presented from an overhead swinging shackle 108 that is suspended from the overhead traveling conveyor 21 with the chicken drumstick joints 109 being releasably retained in the U-shaped depending sections 110 of shackle 108. The suspended chicken 22 will be positioned initially against the face 105 of the plate 100 as the chicken-supporting means moves at the same rate of travel as the shackle supported chicken 22. The projecting rod member 104 and the lug 107 will tend to position and retain the chicken in position on the plate face 105 limiting further swinging and rolling motion of the suspended chicken 22. Shaft-receiving openings 108 and 109 are provided in the free end of the arms 98 and 99 to receive, in cooperation therewith, a chicken-clamping means 25 supported by the shaft 110.

The Chicken-Clamping Means

The chicken-clamping means 25 is best illustrated in FIGS. 1, 6–9, and 10. The chicken-clamping means base plate 111 is provided at the forward edge 112 with a pair of spaced sleeves 113 and 114 having shaft-receiving openings 115 for pivoting action on shaft 110 relative to the chicken-supporting means 23. The rear section 116 of plate 111 is provided with an upturned flange 117 through which an opening (not shown) is drilled to receive and support a high density plastic bearingly-supported roller 118. An upwardly inclined brace 119 is secured to the plate 113 at an appropriate angle to have mounted at the upper end 120 thereof a partial cylindrically-shaped clamping member 121 having a converging freely-extending end section 122 with the entire member 121 being cantilevered from the upper section 120 of brace 119. A longitudinally-extending slot 123 is provided in the clamping housing 121 through which a chicken breast severing means may pass as will be described hereafter. A reinforcing rod 142' is securely mounted at the rear section 125 of housing 121 to limit any lateral displacement of the split housing 121 and elongated slot 126 is positioned in the upper section 120 of the brace 119 in alignment with slot 123 to permit entry, if necessary, of a breast splitting blade. Forcep-acting cams 127 and 128 in the form of inverted U-shaped sections are securely fastened to the upper portion of the clamping housing 121 and to the downwardly converging sections 122 on each side of the slot 123.

Figure 7:
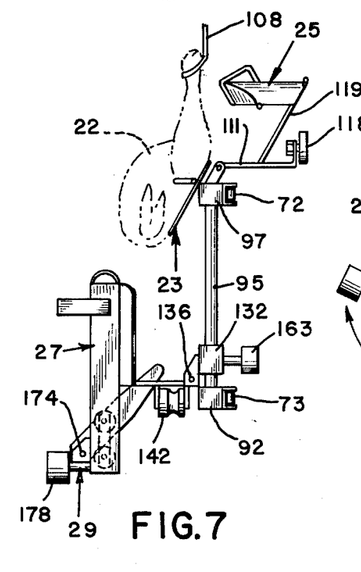
FIG. 7 is a partial right side view of FIG. 6, with portions of the cams, raceways, tracks and other parts removed.
Figures 8, 9:
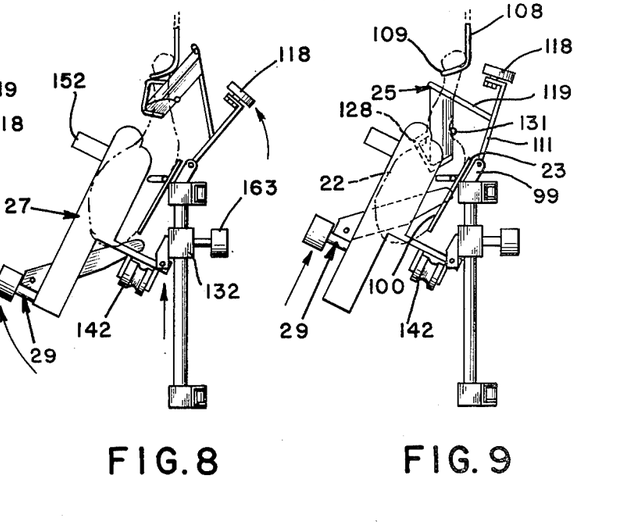
FIGS. 8 and 9 are sequential views of the components illustrated in FIG. 7 through the breast splitting operation.

At the proper location during travel along the tracks 76 for guiding the roller 118, the chicken-clamping means 25 will be pivoted in a counterclockwise direction from the position shown in FIG. 7 to that shown in FIG. 8, as an intermediate position of the chicken-clamping means 25 until it is pivoted into full chicken-clamping position as shown in FIG. 9 during further travel along the tracks 76 with the entire assembly.

As shown in FIG. 9, the chicken 22 is firmly resting against the chicken-supporting means 23 and firmly clamped in position on the chicken-supporting means 23 by means of the chicken-clamping means 25 with the converging projecting section 122 and the forcep-acting cams 127 and 128 being projected into the chicken opening and cavity 129 from which cavity the viscera liver, heart, and other parts have been removed in prior processing operations. The laterally extending securing arms 130 and 131 are secured to the clamping housing 121 in juxtaposition to the medial portion of the housing 121 to engage the medial portion of the drumsticks, as shown in FIG. 9, to prevent leg movement and further limit chicken displacement in the upper regions of the suspended chicken 22.

The chicken 122 when positioned on the chicken-supporting means 123 must be properly located for positioning with its back resting upon the chicken-supporting means 23 to orient and firmly position the chicken from the breast side which is achieved through the chicken-positioning means 27.

The Chicken-Positioning Means

The chicken-positioning means 27 is shown in FIGS. 1 and 6–10 in various positions and views. The function of the chicken-positioning means is to capture or grasp and position firmly a chicken 22 in the desired location to present the chicken breast for breast splitting by the breast splitting means 29. The chicken-positioning means is mounted for vertical and tilting action on the vertically displaceable high density plastic blocks 132 through the projecting lugs 133 and 134 that are mounted on block 132, each of which lugs is provided with shaft receiving openings 135 through which openings a shaft 136 is supported. Shaft 136 retains the U-shaped supporting bracket 137 having rearwardly extending legs 138 and 139 through which shaft-receiving openings 140 pass to receive and be pivotally mounted on shaft 136.

A track guide roller 141 having a circumferential groove 142 is bearingly supported from the depending spaced legs 143 in which shaft-receiving openings 144 support on axle 145 on which the roller 141 will rotate with the legs 143 being secured to the bridge plate 146 to which the bracket 137 is secured at one end thereof with the other end being secured to the vertical guide frame 147 of the chicken positioning means 27. The guide frame 147 is supported by the side rails 148 each of which is provided with an elongated roller-retaining track 149 and 150 at each side of the chicken-positioning means 27 with the upper portion thereof being retained in a spaced relation by means of the U-shaped retaining bracket 151 with the projecting legs 153 and 154 being suitably secured to the side walls 148 at the upper portions thereof. A pair of outwardly diverging camming plates 155 and 156 is secured at a preselected angle on the inwardly extending partial walls 157 and 158 that are mounted to the vertical and inner section of the camming rails 149 and 150. The diverging plates 155 and 156 are spaced from each other to form a vertically extending slot 159 therebetween with the lower sections 160 and 161 being spaced apart forming a slot 162 which communicates with the vertical slot 159.

As shown in the sequence of FIGS. 7–9, the chicken-positioning means 27, in FIG. 7, is in the lowered disengaged position while a chicken 22 is positioned on the chicken-supporting means 23. As the chicken-positioning carriage means 27 travels to the left as shown in FIG. 1, in conjunction with the chicken-supporting carriage means 23, the chicken-positioning means is tilted upwardly by elevating the block 132 through the high density plastic roller 163 which is rotatably supported in the protruding bracket 164 that is attached to the rear side of block 132 by roller contact with track 77. As the block 132 is elevated, as shown in FIG. 8, guide roller 142 moving along bottom track 77 will be tilted in a counterclockwise direction as shown schematically in FIG. 8 in which sequence the chicken is firmly constrained while being cammed by the camming members 155 and 156 into the selected position for exposing the breastbone in alignment with the slots 159 and 162 for exposure to the displaceable breast splitting means 29.

The Displaceable Breast Splitting Means

The displaceable breast splitting or severing means 29 is shown in FIGS. 1, and 7–10. The displaceable breast splitting means 29 is mounted on a vertically displaceable carriage 165 from which side walls 166 protrude, only one of which is shown in FIG. 10, and from each of which side walls 166 a pair of vertically spaced and bearingly rotatable rollers 67 is mounted for supporting carriage 167 for vertical displacement within the spaced tracks or guideways 149 and 150. The lower rollers 167 on the carriage 165, in the lowered position, as shown in FIGS. 7 and 10, will rest upon the supporting strap 168 which extends transversely beneath the lower sections of the guide rails 149 and 150 with the ends 170 being upturned for secure mountings, as by welding, to the exterior of the housing 171 at each side of the chicken-positioning means 27. Severing-blade securing lugs 172 are spaced from each other and are secured to the plate 165 and extend outwardly to support therebetween the upwardly inclined breast splitting blade 173 removably locked into the blade supporting lugs 172 by means of a blade securing bolt 174 passed through the openings 175 in the blade holder lugs 172 to support the upwardly inclined blade 172 through the slot 176 in the breast splitting carriage 165 and passing through and upwardly into the slots 162 and 159 during vertical displacement of the breast splitting carriage 165.

Carriage 165 has a projecting stub shaft 177 secured at the base thereof below the protruding blade-supporting members 172 for rotatably supporting a high density plastic roller 178 thereon. The breast severing actuating roller 178 will be actuated in timed sequence, substantially as shown in FIGS. 7–9, after the chicken-clamping means 25 and the chicken-positioning means 27 have firmly positioned and clamped the chicken 22 on the chicken-supporting means 23 at which time the roller 178 will engage the upwardly inclined camming track 78 to urge the carriage 165 forming a part of the displaceable breast splitting means 29 vertically introducing the upper cutting edge 179 into engagement with the breastbone of the chicken 22 with the blade 179 being guided through the slots 101 of the chicken-supporting means and the slots 123 between the forcep-acting camming members 127 and 128 incrementally to the uppermost position at the terminal portion 180 on the roller-engaging raceway 78 which may yield resiliently depending upon the upward force exerted on the roller 178 as it serves through the breast and breastbone of the clamped chicken 22. At the end of the splitting operation, the displaceable breast-severing means will be lowered rapidly upon engaging the downwardly extending supporting track 181 connected to the track 78.

Upon disengagement of the displaceable breast severing means 29 from the breast-severed chicken 22, the chicken-clamping means will be pivoted upwardly to the retracted position shown in FIG. 7, and the chicken-positioning means 27 will disengage the breast-severed chicken 22 and be repositioned to the position illustrated in FIG. 7 through the action of the respective tracks thereby removing all restraints on the chicken 22 except for the chicken-supporting means 23 on which the chicken 22 rests until it is removed by supporting shackle 108 passing beyond the rectilinear travel of the chicken-supporting means 23 at the discharge position 31 as shown in FIG. 1. The breast split chicken continues along its path of travel while remaining suspended from its shackle 108 to be subjected to further processing.

The Apparatus Cleansing Station

Upon completion of the breast splitting operation, the chicken-supporting means 23, the chicken-clamping means 25, the chicken-positioning means 27 and the displaceable breast splitting means 29, in their open and disengaged positions pass continuously under an overhead cleansing sprayer head 182, as shown in FIG. 3, which is supplied with a cleansing fluid under pressure through the line 183 that is supplied from the supply pipe 184 from which cleansing fluid from a remote location under pressure is supplied. An additional series of spray nozzles 185 is supported on a header 186 and header 187 for spraying cleansing fluid against the chicken-positioning means 27 and displaceable breast splitting means 29 to wash the various components thoroughly before each component is placed into the next sequence of operation for the next chicken to be breast split. The hood 188 is mounted on the projecting angle iron frame 189 that extends on one side only of the apparatus 20 to limit the spread of the sprayed cleansing fluid.

A manually operated valve (not shown) is connected into the supply line 184 to control the inlet of cleansing fluid whether required continuously or intermittently.

The number of individual units, the size of the apparatus and the particular configuration of each of the components may vary considerably depending upon the particular poultry being processed. It is also not essential that the apparatus 20 be constructed in a corousel form and may be modified for different configurations depending upon space limitations, among other factors. Department of Agriculture standards require the highest sanitary conditions and materials be employed throughout poultry processing apparatus and, accordingly, as many components as possible are made of stainless steel or high density plastic materials that will not corrode or become contaminated during use, and all components coming in contact with the poultry being processed must be washable thoroughly and periodically depending upon the extent of utilization of the apparatus. It is also apparent that an overhead conveyor 21 with suspended shackles 108 need not be employed in conjunction with apparatus 20 because the chicken 22 may be positioned manually on the chicken-supporting means 23 for the breast splitting process.

The Method for Splitting Chicken Breasts

The chickens 22 to be processed are fed to a chicken supporting position, such as the chicken-supporting means 23, and securely clamped in position on the chicken-supporting member, by the chicken-clamping means 25 and the chicken-positioning means 27, in order to orient, clamp and retain the chicken in a preselected position preparatory for breast splitting by exposing the chicken breast and bone. The chicken breast and bone that are exposed are severed, as by the vertically displaceable breast splitting means 29. After the breast splitting operation is completed, the splitting knife is removed and the chicken is released from the clamping and restraining and positioning action exerted initially with the breast split chicken being moved along a directed path of travel for further processing on the conveyor 21.

The use of titles to designate specific components, mechanisms and assemblies is not intended for restriction or limitation in the claims, and the specific use of similar terminology in the claims is not to be limited to the designated nomenclature in the specification but is intended for generic applicability.

We claim:

1. An apparatus for splitting a chicken breast comprising; a chicken-supporting means for receiving a chicken in a predetermined position, a chicken-clamping means for engaging and retaining a chicken received on said chicken-supporting means, a displaceable breast clamping means movable into and out of engagement with a chicken positioned on said chicken-supporting means and each displaceable breast clamping means having a displaceable breast-splitting means for engaging and splitting the breast of a chicken retained on said chicken-supporting means and releasably clamped thereon by said chicken-clamping means and said displaceable breast-clamping means whereby upon displacement of said chicken-supporting means said breast-splitting means vertically progressively engages and splits the breast of a clamped chicken as it travels along a directed path of travel.

2. An apparatus for splitting the breast of a chicken as claimed in claim 1, and means for displacing said chicken-supporting means and said chicken-clamping means in a directed path of travel.

3. An apparatus for splitting the breast of a chicken as claimed in claim 1, said chicken-clamping means including means for orienting the chicken breast of the supported chicken in a clamped position exposing the chicken breast for alignment with said chicken breast engaging and splitting means.

4. An apparatus for splitting the breast of a chicken as claimed in claim 1, and means for automatically and sequentially clamping the chicken and severing the chicken breast as the chicken is moved along a directed path of travel.

5. An apparatus for splitting the breast of a chicken as claimed in claim 1, and means for disengaging the clamped chicken after the chicken breast is split.

6. An apparatus for splitting the breast of a chicken as claimed in claim 1, means for supporting and conveying a chicken and delivering it along a direct path of travel in line with said chicken-supporting means path of travel for positioning a chicken onto said chicken-supporting means while retaining the chicken suspended from said supporting and conveying means during breast splitting of the chicken and disengaging said chicken-clamping means from said chicken while the chicken is supported by said supporting and conveying means.

7. An apparatus for splitting the breast of a chicken as claimed in claim 1, means for retaining said chicken-supporting means and conveying it along a predetermined travel path, said chicken-clamping means being conveyed with said chicken-supporting means, means cooperating with said chicken-clamping means having means for retaining the upper portion of the chicken breast on said chicken-supporting means, means for cooperatively engaging and positioning the chicken breast on said chicken-supporting means while conveying said chicken along a directed travel path for retaining said chicken and exposing the chicken breast to said displaceable breast splitting means, and means for actuating said breast splitting means in the travel path while said chicken remains clamped and before release of said chicken-clamping means on the chicken.

8. An apparatus for splitting the breast of a chicken as claimed in claim 7, shackle and conveyor means for conveying a shackle suspended chicken to be breast split and presenting the chicken to said chicken-supporting means with said shackle and conveyor means being synchronized with said chicken-supporting means whereby a shackled chicken moving along a directed path of travel will coincide with and be positioned on said chicken-supporting means in the directed path of travel of said chicken-supporting means.

9. An apparatus for splitting the breast of a chicken as claimed in claim 1, a plurality of said chicken-supporting means spaced from each other with each of said chicken-supporting means cooperatively receiving a chicken delivered thereto in a predetermined position, a plurality of chicken-clamping means for engaging and retaining a chicken positioned on each of said chicken-supporting means and cooperating therewith, a plurality of displaceable breast-splitting means for engaging and splitting the breast of a chicken retained on each of said chicken-supporting means and retained by each of said chicken-clamping means, and means for displacing said plurality of chicken-supporting means and said chicken-clamping means along a predetermined path of travel, and means along the directed path of travel of said chicken-supporting means and chicken-clamping means for displacing said displaceable breast-splitting means for engaging and splitting each of the chicken breasts retained by said chicken-supporting means and said chicken-clamping means.

10. An apparatus for splitting the breast of a chicken as claimed in claim 9, said plurality of said chicken-supporting means being supported for displacement along a directed path of travel in a closed path, and a shackle and conveyor means for presenting chickens individually to each of said chicken-supporting means in synchronization with the displacement of said chicken-supporting means.

11. An apparatus for splitting the breast of a chicken comprising: a plurality of chicken-supporting shackles uniformly spaced from each other traveling horizontally in a directed path of travel for supporting a partially processed chicken having the viscera removed and the viscera cavity extending in an upward position, conveyor means supporting said shackles with a chicken on each of said shackles, drive means for urging said shackles along a directed path of travel at a vertical distance above a floor, a frame positioned beneath said path of said shackle travel, said frame having an upper structure supported thereon, said upper structure having means for displacing said upper structure on said frame into and out of the path of shackle travel, a plurality of spaced chicken-supporting frames, an endless conveyor means mounted on said upper structure for retaining said chicken-supporting frame in spaced relation and in cooperative alignment with said chicken-supporting shackle, means for driving said endless conveyor means in synchronization with said shackle drive means, a chicken-clamping means connected to each of said chicken-supporting means for displacement from an inoperative to an operative position to releasably clamp a chicken on said chicken-supporting means in the chicken-clamping means operative position, means for displacing said chicken-clamping means from an inoperative to an operative clamping position against each chicken supported on said chicken-supporting means, a clamping spreader means pivotally connected to each chicken-clamping means whereby upon displacement of each of said chicken-clamping means said clamping spreader means being introduced into the chicken cavity urging the chicken breast into a preselected locked position on said chicken-supporting means and exposing the chicken breast for splitting, a plurality of cooperating breast positioning means displaceable with each of said chicken-clamping means and having means thereon for orienting the chicken breast and bone into a predetermined position on said chicken-supporting means while the chicken remains supported on the chicken-supported shackle, means to actuate said breast splitting means during travel of the chicken-supporting means, chicken-clamping means and chicken-positioning means to split the breast of a chicken automatically in the travel path, and means removing said chicken breast splitting means, chicken-positioning means and chicken-clamping means to release the breast split chicken while traveling and suspended from the chicken supporting sshackle.

12. An apparatus for splitting the breast of a chicken as claimed in claim 11, and means for spraying said chicken-supporting means, said chicken-clamping means, said chicken-positioning means and said endless conveyor after each of said chickens has been released and removed from said chicken-supporting means.

13. A method of splitting a chicken breast comprising the steps of; positioning a chicken on a chicken positioning surface for retention in a predetermined position, conveying said positioned chicken on said chicken positioning surface along a directed path of travel releasably clamping the chicken above said surface in a preselected position and retaining it in a substantially stable position with the chicken breast and bone exposed for splitting, releasably clamping the exposed chicken breast and bone to retain the chicken in a substantially rigid position on said surface, and splitting the chicken breast and bone progressively while the chicken is in a clamped position and continuously traveling during a portion of its directed path of travel.

14. A method of splitting a chicken breast as claimed in claim 13, supplying a chicken in a suspended position along a directed path to coincide with said chicken positioning surface and in synchronization therewith.

15. A method of splitting a chicken breast as claimed in claim 13, said positioning, clamping and splitting occurring sequentially and automatically.

16. A method of splitting a chicken breast as claimed in claim 13, and releasing the chicken after having split the chicken breast and bone while the chicken continues to travel along a directed path.

17. A method of splitting a chicken breast as claimed in claim 16, and releasing the chicken after having the chicken breast and bone split for travel along a directed path.

* * * * *